US008626939B2

(12) United States Patent
Jackson et al.

(10) Patent No.: US 8,626,939 B2
(45) Date of Patent: Jan. 7, 2014

(54) METHOD AND APPARATUS FOR STREAMING DATA

(75) Inventors: Callum Peter Jackson, Fareham (GB); Nanami Smith, Southhampton (GB)

(73) Assignee: International Business Machines Corporation, Armonk, NY (US)

( * ) Notice: Subject to any disclaimer, the term of this patent is extended or adjusted under 35 U.S.C. 154(b) by 1704 days.

(21) Appl. No.: 11/400,952

(22) Filed: Apr. 10, 2006

(65) Prior Publication Data

US 2006/0248214 A1    Nov. 2, 2006

(30) Foreign Application Priority Data

Apr. 30, 2005 (GB) .................................. 0508946.1

(51) Int. Cl.
*G06F 15/16* (2006.01)
(52) U.S. Cl.
USPC .......................... 709/231; 379/88.14; 704/270
(58) Field of Classification Search
USPC ......... 709/231–235, 201–202, 204, 217, 219, 709/226, 229; 379/88.13–88.14, 83.15, 379/83.24, 100.13, 908; 704/1, 258, 262, 704/270–278
See application file for complete search history.

(56) References Cited

U.S. PATENT DOCUMENTS

| 5,016,226 | A | * | 5/1991 | Hiwada et al. | ........... | 365/233.17 |
| 5,583,652 | A | * | 12/1996 | Ware | ................................ | 386/75 |
| 5,864,678 | A | * | 1/1999 | Riddle | .......................... | 709/235 |
| 5,890,203 | A | * | 3/1999 | Aoki | .............................. | 711/111 |
| 5,928,330 | A | * | 7/1999 | Goetz et al. | .................... | 709/231 |
| 6,112,239 | A | | 8/2000 | Kenner et al. | .................. | 709/224 |
| 6,138,164 | A | * | 10/2000 | Kobata et al. | .................. | 709/231 |
| 6,466,909 | B1 | * | 10/2002 | Didcock | ........................ | 704/260 |
| 6,502,139 | B1 | * | 12/2002 | Birk et al. | ...................... | 709/233 |
| 6,557,026 | B1 | * | 4/2003 | Stephens, Jr. | .................. | 709/203 |
| 6,618,820 | B1 | * | 9/2003 | Krum | ................................ | 714/13 |
| 6,766,407 | B1 | | 7/2004 | Lisitsa et al. | .................. | 710/316 |
| 6,839,768 | B2 | * | 1/2005 | Ma et al. | ........................ | 709/235 |
| 7,197,557 | B1 | * | 3/2007 | Asar et al. | ..................... | 709/224 |

(Continued)

FOREIGN PATENT DOCUMENTS

EP            1182875         2/2002

OTHER PUBLICATIONS

Taal et al, "Adaptive End-to-End Optimization of Mobile Video Streaming Using QoS Negotiation", May 31, 2002.
Beggs et al, "Designing Web Audio", Jan. 2001.

(Continued)

*Primary Examiner* — Saleh Najjar
*Assistant Examiner* — Eric W Shepperd
(74) *Attorney, Agent, or Firm* — GRASSO PLLC; Fred Grasso

(57) ABSTRACT

Method and apparatus for negotiation of streaming data, suitable for application in an environment wherein a server generates and serves large, continuous amounts of speech data to a client in real time. A method of controlling the play out of a generated data stream from a data stream player includes estimating a time for generating the data stream; estimating a time for playing the data stream; generating a data stream using a data stream generation resource, for output by the data stream player; and alerting the stream player if the remaining generation time is less than the play time. The server may calculate what it can do, given knowledge of the network, and send a message to guarantee a level of service. A "can start play" message may be sent to client when the client can reliably start playing the signal.

18 Claims, 4 Drawing Sheets

(56) References Cited

U.S. PATENT DOCUMENTS

| | | |
|---|---|---|
| 7,337,231 B1 * | 2/2008 | Li .................................. 709/231 |
| 7,430,609 B2 * | 9/2008 | Brown et al. ................... 709/231 |
| 2002/0083173 A1 * | 6/2002 | Musoll et al. ................... 709/225 |
| 2002/0095683 A1 * | 7/2002 | Watanabe ......................... 725/90 |
| 2003/0055910 A1 * | 3/2003 | Amini et al. .................... 709/214 |
| 2003/0093543 A1 * | 5/2003 | Cheung et al. .................. 709/231 |
| 2003/0163478 A1 * | 8/2003 | Kirkland ......................... 707/102 |
| 2004/0039834 A1 * | 2/2004 | Saunders et al. ............... 709/231 |
| 2004/0044783 A1 * | 3/2004 | Nordberg ........................ 709/231 |
| 2004/0250273 A1 * | 12/2004 | Swix et al. ........................ 725/25 |
| 2006/0092938 A1 * | 5/2006 | Gentrix ........................... 370/390 |
| 2006/0146185 A1 * | 7/2006 | Chen ........................... 348/410.1 |

OTHER PUBLICATIONS

Kim et al, "TCP-friendly Internet Video Streaming employing Variable Frame-rate Encoding and Interpolation", Mar. 20, 2000.

* cited by examiner

METHOD AND APPARATUS FOR STREAMING DATA

FIELD OF THE INVENTION

The invention relates to a method and apparatus for streaming data, and in particular the invention relates to a method and apparatus in a server that generates and serves large, continuous amounts of speech data to a client in real time.

BACKGROUND

A server receives a request for real time processing from a client. This request requires the server to carry out continuous processing while providing blocks of processed data to the client. Data blocks are streamed from the server to the client, which plays these data blocks continuously.

In a problem-free scenario, server-side processing is capable of providing blocks continuously to the client. Depending on the data that is being streamed, a client might be set up to buffer none, all, or a specified number of data blocks before allowing play to take place.

A server is expected to experience times under stress; for example, when bandwidth is low or CPU usage is high. This is likely to impact the server's ability to process and stream data continuously. To some extent buffering provides a solution to this problem. However, a static client side buffer does not take the server's current workload or network bandwidth into consideration.

The outcome, with regard to the client-side, can be variable. Two likely scenarios follow. In the first, the client stores additional data, effectively waiting for all requested data to arrive before commencing play. The implication for the client end user is that they must wait an undesirable length of time between requesting and receiving play of data. In the second scenario, inadequate data is stored by the client, and buffer under-run occurs. Consequently, the end user experiences interruptions in play.

Sizing a text-to-speech (TTS) system is not trivial. If the size of the TTS data transmission is calculated incorrectly, several problems can occur. With the client system under stress, the quality of the TTS is greatly reduced. If the TTS server is under stress, then the TTS can be played to the caller in bits, which would seem unnatural. If the client system (typically an interactive voice response system) detects under-run, then the whole prompt could be replayed. In all cases the caller suffers a negative experience of the system and is less likely to use the system in the future.

U.S. Pat. No. 6,766,407, "Intelligent streaming framework," describes a streaming framework manager that coordinates elements of a streaming solution based on the analysis of the properties of a particular connection. The patent does not consider the streaming generator workload.

U.S. Pat. No. 6,112,239, "System and method for server-side optimization of data delivery on a distributed computer network," involves server-side optimization and network performance information. This patent is concerned with redirecting data to various delivery sites and servers, in accordance with network information.

EP patent publication 1182875, "Streaming method and corresponding system," is described in terms of negotiation driven by the client capacities rather than from the server, but involves optimization to avoid buffer underflow and overflow. Changes in transmission capacity are detected and reacted to. The client terminal is responsible for using transmission capacity to calculate an appropriate buffer level and delay, and consequently instructing the server to transmit at a particular rate. However, the server performance is not considered.

SUMMARY

According to a first aspect of the present invention, there is provided a method of controlling the play out of a generated media data stream from a data stream player, comprising: estimating a generation time for generating the data stream; estimating a play time for the data stream; generating a data stream using a data stream generation resource, for output by the data stream player; and alerting the data stream player if the remaining generation time is not more than the play time (that is, the remaining generation time is equal to or less than the play time).

In a preferred embodiment of the invention, the server calculates what it can do, given knowledge of the network, and sends a message to guarantee a level of service from a point in time onwards. A "can start play" message is sent to client at a point when the client can reliably start playing the signal. This embodiment of the invention takes into account the server's processing capabilities and takes responsibility for prioritizing processes to guarantee a level of service to the client.

A preferred embodiment of the invention determines when sufficient audio has been sent and when the client should start playing. The controlling server-client communication is implemented within the protocol used to send the data, and this information should be available for use by client-side applications.

In the specification, the difference between the play time of a data stream and the remaining generation time of the data stream is called the critical buffer point. The stream player is alerted when the critical buffer point is reached, that is when the critical buffer becomes zero.

Advantageously, the rate of generation of the data stream is forced to be at the same rate or faster after the alert has been sent. It is more advantageous where each data stream has a priority and the priority is raised within the generation resource to maintain the rate after the alert has been sent.

Preferably, the remaining generation time is obtained from the data stream generation resource each time it is compared to the play time. The remaining generation time can be estimated from the elapsed time from the original estimate of the generation time or more advantageously a new estimate of the generation time can be made after the original estimate. A new estimate of the generation time allows the changing work load of the generation resource to be taken into account.

More preferably, the alert is sent from the server to the client. In a preferred embodiment, it is the server that calculates the difference between the generation and the play times since the generation time changes at the server and generation time updates are more easily obtained at the server. However, if the generation time was sent to the client, then the client could calculate the best time to start the play out of the data.

The invention may be suitably applied when, for example, the media data stream is speech data and the generation resource is a text-to-speech engine. Although TTS is particularly susceptible to interruption since it must be played out at a constant rate, other types of generation engines could use this technique to reduce interruptions of the media stream, for example, video graphics requiring a constant rate output. The TTS engine keeps the TTS controller updated with the TTS generation time throughout the transmission of the TTS data stream.

BRIEF DESCRIPTION OF THE DRAWINGS

Embodiments of the invention will now be described, by means of example only, with reference to the accompanying drawings, in which.

DETAILED DESCRIPTION

Figure 1:
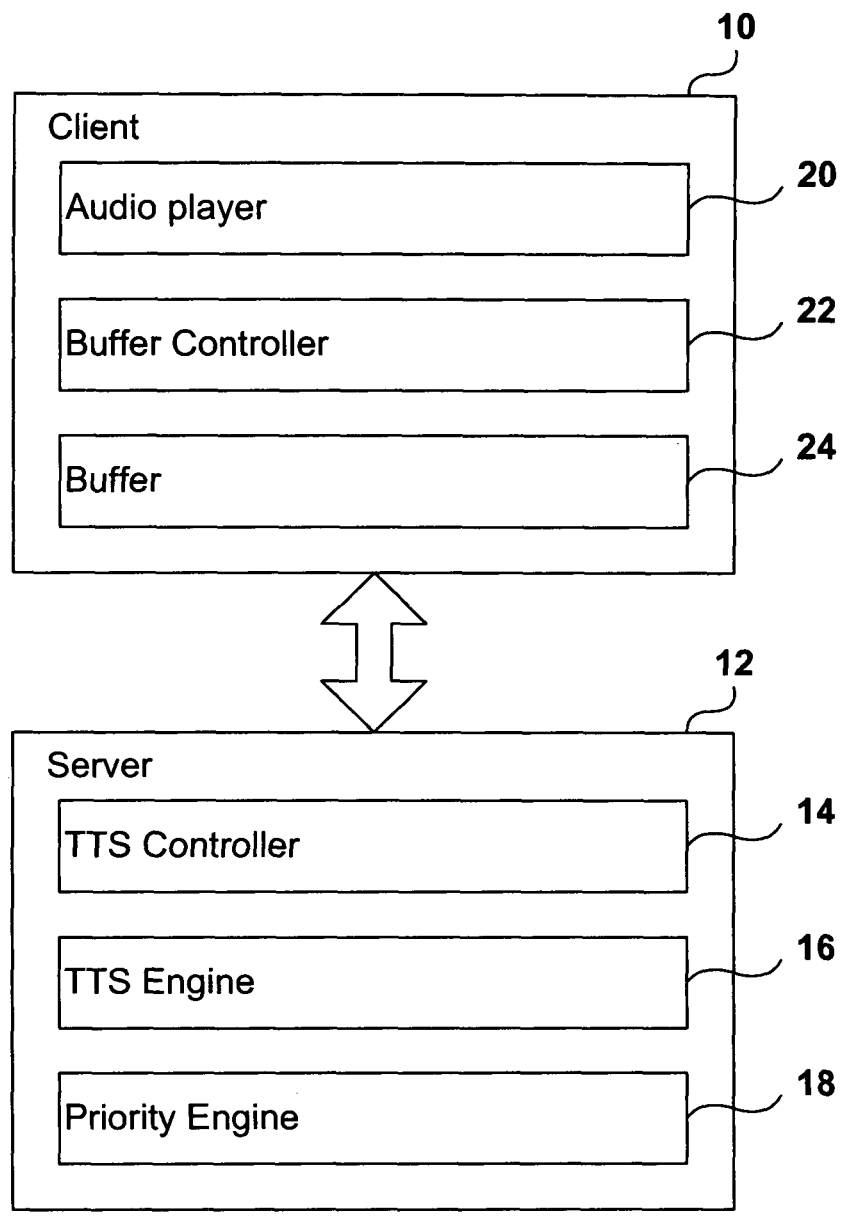
FIG. 1 is a schematic client and server arrangement.

In FIG. 1 there is shown a client 10 and server 12 arrangement according to a preferred embodiment. The server 12 comprises: a TTS controller 14; a text-to-speech (TTS) engine 16; and a priority engine 18. The client 10 comprises: an audio player 20; buffer controller 22; and a buffer 24.

The TTS controller 14 processes TTS requests from one or more clients 10 and directs TTS transmissions from the TTS engine 16 using TTS controller method 200.

The TTS engine 16 generates a TTS data stream on request from a client 10. As part of the initiation of the sending, the TTS engine 16 calculates the time taken to generate the TTS data stream (generation time) and the time taken to play the TTS data stream (play time).

The priority engine 18 performs load balancing on the TTS engine 16 by controlling the assignment of TTS engine resource according to a priority of the data stream. Initially each data stream is assigned an average priority but this priority can be changed during the processing. If one data stream has a higher priority than other data streams then this one data stream will be processed faster than the other data streams. The priority engine 18 responds to the TTS controller 14 and adapts the assignment of TTS engine resource accordingly.

The client buffer 24 receives a data stream from the server 12, and stores it until the client audio player 20 requests the data for play out.

The buffer controller 22 initiates the request for the data stream, in a simple case, after prompting by the user through an interface of the client audio player 20. In a more complex case, a user interaction is controlled by an interactive voice response application and the application makes requests for the audio stream after certain user interactions.

The client audio player 20 comprises an interface with an input and an output. The input takes user commands for selecting data streams or for engaging with an interactive voice application.

Figure 2:
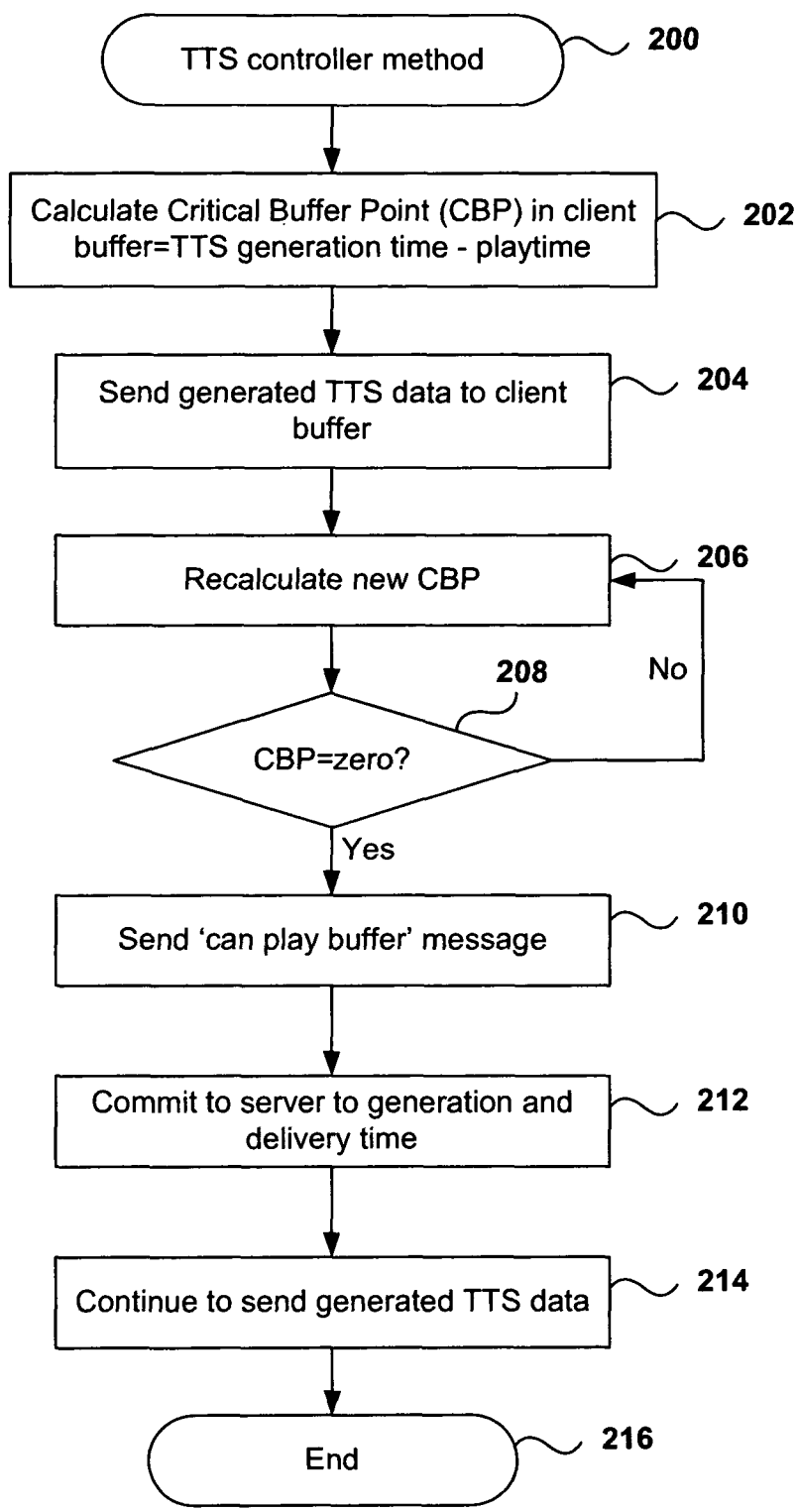
FIG. 2 is a flow diagram of the server controller method.

FIG. 2 describes the TTS controller method 200 performed by the TTS controller 14.

Step 202 starts after the TTS request is received from the client. In step 202 the TTS controller 14 calculates the critical buffer point (CBP) by subtracting the play time of the TTS data stream from the TTS generation time. In a preferred embodiment, the TTS generation time is calculated taking account of the size of the text for conversion and the workload of the TTS engine. A further embodiment may also use the network workload in the calculation. Alternatively, the size of the text alone is a simple factor which gives a useful TTS generation time.

Step 204 is the initiation of the sending of the TTS data stream from the TTS engine 16 to the client 10. As the TTS data stream is generated and sent, the time taken to generate the TTS data stream changes as the loading of the TTS engine changes.

In step 206, a continuous loop is started, and a new CBP is recalculated based on the new TTS generation time. The TTS engine 16 keeps the TTS controller 14 updated with the TTS generation time throughout the transmission of the TTS data stream. In a preferred embodiment, the continuous recalculation of the CBP greatly improves the accuracy in high workload situations where the TTS generation time can vary from point to point. However, another useful embodiment may also include a CBP which is only calculated once.

In step 208, the CBP is checked to see if it is zero or less (i.e. the remaining generation time is equal to or less than the play out time) and loops back to step 206 until it is. During this loop the TTS data is being sent to the client buffer 24 and the remaining generation time is shrinking. Once the CBP has reached zero then the process moves on step 210.

In step 210, the TTS controller 14 alerts the client 10 that the CBP has reached zero by sending a 'can play buffer' message.

In step 212, the TTS controller 14 commits the TTS engine to the generation and delivery rate by instructing the priority engine to increase the priority of the data stream processing.

Step 216 is the end of the control method, although as in step 214 the TTS engine can still be generating the TTS data stream and the client may still be playing out the data stream.

The client buffer controller 22 uses client controller method 300 to process the TTS data stream.

In step 302, the buffer controller 22 requests TTS from the server 12.

In step 304, the buffer controller 22 receives TTS data stream from the server.

In step 306, the buffer controller 22 waits until it is possible to start the play buffer.

In optional step 308, the buffer controller 22 waits to start the play buffer.

Figure 3:
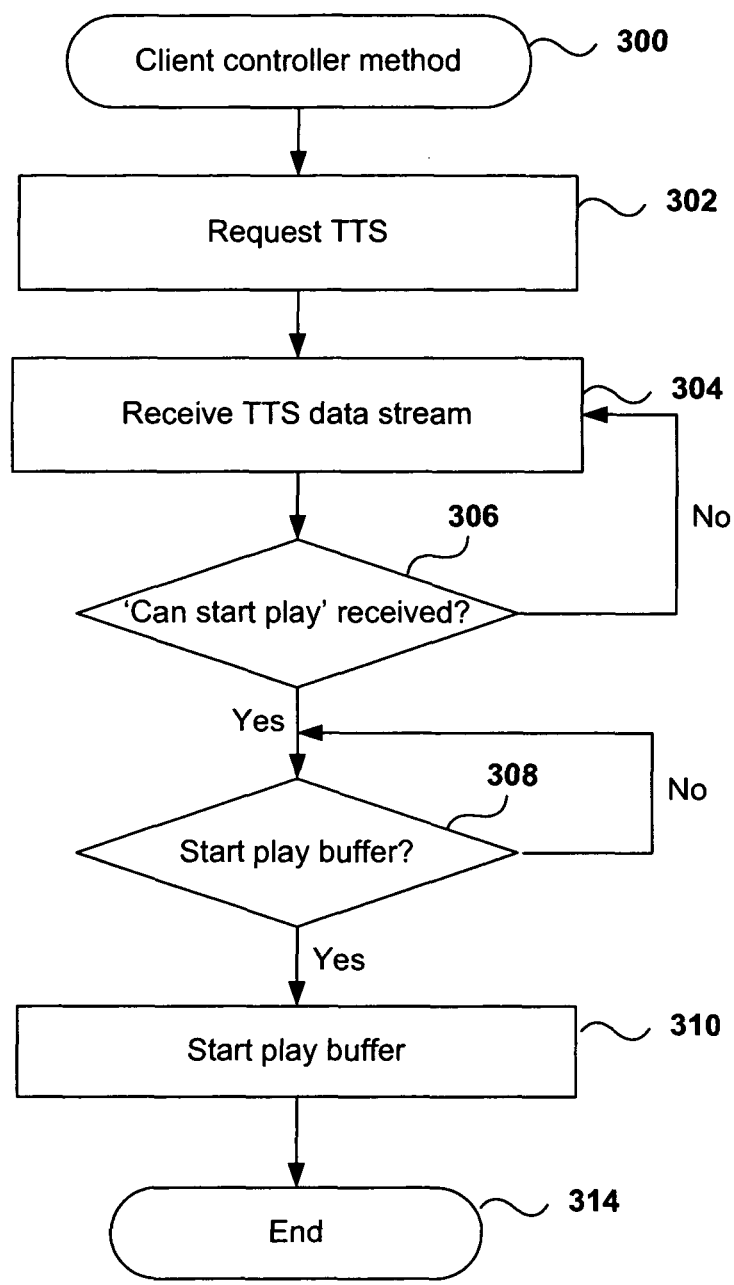
FIG. 3 is a flow diagram of a client controller method.

In step 310, the play buffer is played out while the TTS data stream is still received. Step 314 shows the end of the client controller method of FIG. 3.

Below is an example of operation of the preferred embodiment for a text-to-speech data stream that takes 12 seconds to generate and 6 seconds to play out.

Figure 4A:
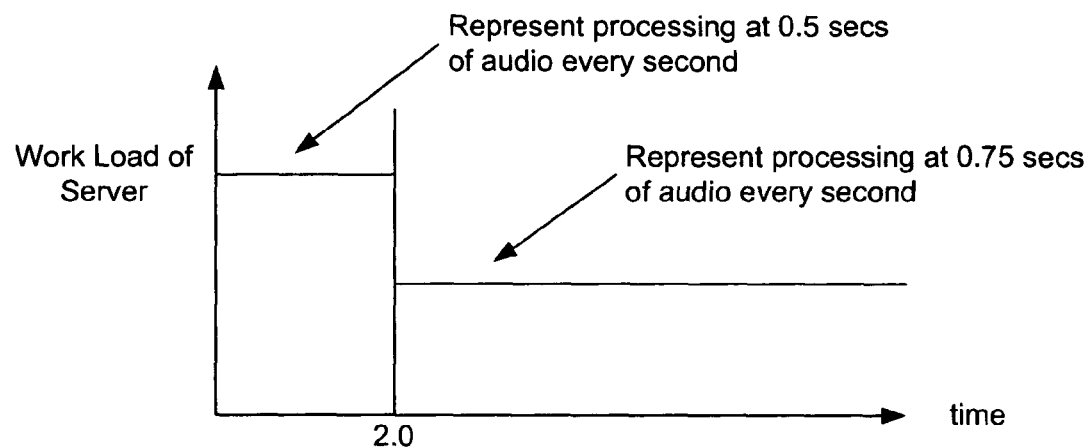
FIG. 4A is a graph of an example TTS server workload with respect to time.

FIG. 4A is a graph of an example TTS server 12 workload verses time. Here, the server is able to process 0.5 seconds of audio every second for the first two seconds. After 2.0 seconds, because of a reduced workload, the TTS server 12 is able to process 0.75 seconds of audio every second. When the server 12 initially receives the TTS request, the TTS server 12 can only deliver 0.5 seconds of audio for every elapsed second. A critical point of 6.0 seconds is determined by subtracting the time to play the request (6.0 seconds) from the time to process the request (12.0 seconds). The server process schedules to send a 'can play buffer' signal to the client after 6.0 seconds have elapsed.

Figure 4B:
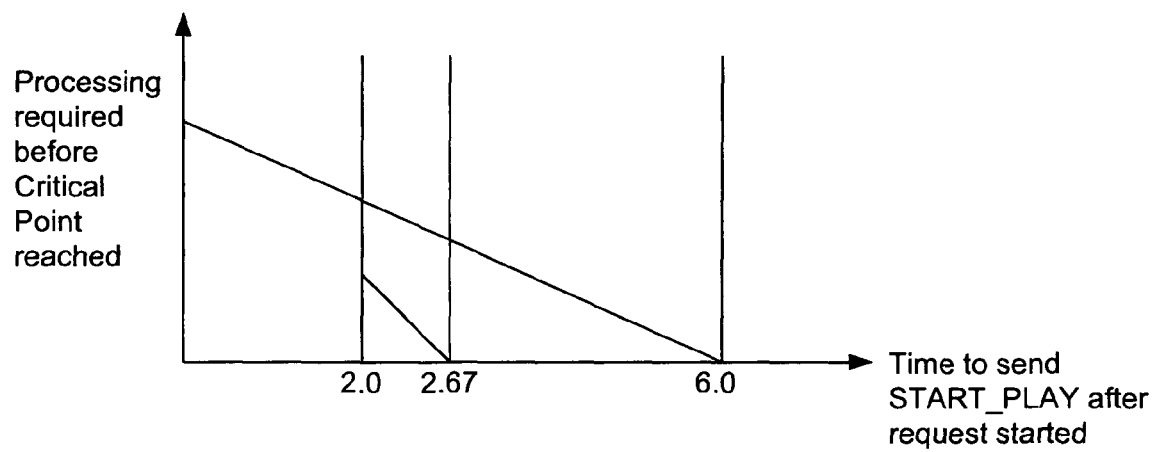
FIG. 4B is a graph of the corresponding TTS generation and critical buffer points.

However, after 2.0 seconds of elapsed time, the server's load has decreased and now the system is able to deliver 0.75 seconds of audio for every elapsed second. A new critical buffer point determined by subtracting the time to play the request (6.0 seconds) from the time to process the request (5.0/0.75=6.67 seconds) to give 0.67 seconds or 2.67 seconds from the initial request being received (see FIG. 4B). The 'can play buffer' message (START_PLAY in FIG. 4B) is sent after 2.67 seconds instead of 6.0 seconds.

In summary, there is described a method, apparatus, and computer program product, which may include a computer readable medium, for negotiation of streaming data. In particular, it relates to a method and apparatus in a server that generates and serves large continuous amounts of speech data to a client in real time. According to one aspect there is provided a method of controlling the play out of a generated media data stream from a data stream player comprising: estimating a generation time for generating the data stream; estimating a play time for the data stream; generating a data stream using a data stream generation resource, for output by the data stream player; and alerting the stream player if the remaining generation time is substantial equal to or less than the play time. In a preferred embodiment, the server calculates what it can do, given knowledge of the network, and sends a message to guarantee a level of service from a pointon wards. A "can start play" message is sent to client at a point when the client can reliably start playing the signal. A preferred embodiment of the invention takes into account the server's processing capabilities and takes responsibility for prioritizing processes to guarantee a level of service to the client.

We claim:

1. A method of controlling play out of a generated audio data stream from a client data stream player, the method comprising:
    at a server, receiving a request, from a client data stream player, to generate an audio stream by converting textual data received from the client data stream player;
    at the server, receiving, from a client, textual data to be generated by the server to an audio stream;
    at the server, estimating a generation time for generating the audio stream;
    at the server, estimating a time to play the generated audio stream at a data stream player;
    at the server, generating the audio stream using data received from the client and a data stream generation resource, the audio stream for output by the client data stream player;
    buffering at the client, the audio stream generated at the server,
    waiting at the client for an alert from the server indicating that a remaining generation time is not more than a remaining play time;
    sending an alert from the server to the client if remaining generation time for generating the audio stream using the data stream generation resource is not more than remaining play time; and
    maintaining a rate of generation at an initial rate or faster after the alert has been sent,
        wherein generating the audio stream has a priority and the priority is raised in order to maintain the rate of generation of the audio stream after the alert has been sent.

2. The method of claim 1, wherein the remaining generation time is obtained from the data stream generation resource during the generation of the audio stream.

3. The method of claim 1, wherein the alert is sent from the server to the client and wherein remaining generation time is calculated using size of text for conversion from the client and workload of a server text-to-speech engine.

4. The method of claim 1, wherein the audio stream is speech only and the generation resource is a server text-to-speech engine.

5. The method of claim 1 wherein estimating the generation time includes considering the size of the textual data received from the client and considering the current workload of the data stream generation resource and determining if a critical buffer point is zero or less, the critical buffer point being determined by subtracting play time of voice data at a client media stream player from text-to-speech generation time by the data stream generation resource.

6. A system for controlling play out of a generated media data stream from a client data stream player, said system comprising:
    a processor configured to estimate a generation time for generating a media data stream,
        the processor executing instructions that cause the processor to calculate a critical buffer point for a buffer of a client data stream player, the critical buffer point representing a text-to-speech generation time minus a playtime of the speech at a client data stream player,
        the processor also executing instructions that cause the processor to estimate a play time for the media data stream at a client data stream player;
    means for generating the media data stream using a data stream generation resource, for output by the client data stream player,
        wherein the means for generating the media data stream is configured to convert text data received from the client to generate a media data stream consisting of audible speech,
        wherein the means for generating is further configured to keep a controller updated with text-to-speech generation time throughout a transmission of a text-to-speech data stream;
    means for sending an alert to the client data stream player if remaining generation time for generating the media data stream using the data stream generation resource is not more than the play time by a client data stream player; and
    means for maintaining the rate of generation of the media data stream at an initial rate or faster after an alert has been sent,
        wherein the means for maintaining the rate of generation of the media data stream generation is configured to set a priority for generating the media data stream and to further raise the priority for generating the media data stream after the alert has been sent.

7. The system of claim 6, wherein remaining generation time is determined by the data stream generation resource during the generation of the media data stream and wherein remaining generation time is obtained each time from the data stream generation resource each time generation time is compared to play time by a client data stream player.

8. The system of claim 6, wherein the means for sending an alert is in a server.

9. The system of claim 6, wherein the means for generating the media data stream is configured to convert text to speech.

10. The system of claim 6 wherein the means for generating the media data stream is further configured to consider the size of the textual data received from a client and consider the means for generating.

11. A computer program product for controlling the play out of a generated media data stream from a data stream player, said computer program product comprising a non-transitory computer readable medium having computer readable program code tangibly embedded therein, the computer readable program code comprising:
    computer readable program code configured to repeatedly estimate a remaining generation time for generating an audio voice stream from textual data received from a client;
    computer readable program code configured to repeatedly estimate a play time at a client for playing a stream consisting of audio voice converted from the textual data received from the client;

computer readable program code configured to generate an audio voice stream using textual data received from a client and a data stream generation resource at a server, for output by a data stream player at the client;

computer readable program code configured to send an alert to the data stream player at the client if the remaining generation time is not more than the estimated play time at the client data stream player; and computer readable program code configured to maintain the rate of generation of the audio voice stream at an initial rate or faster after the alert has been sent, wherein the audio voice stream generation has a priority and the priority is raised to maintain the rate of generation of the audio voice stream after the alert has been sent.

12. The computer program product of claim 11, wherein the remaining generation time of the audio voice stream is obtained from the data stream generation resource during the generation of the audio voice stream.

13. The computer program product of claim 11, wherein the data stream generation resource is a text-to-speech engine.

14. The computer program product as in claim 11 wherein the computer readable program code is further configured to consider the size of the textual data received from the client and consider the current workload of the data stream generation resource.

15. A system for controlling play out of a generated media data stream from a client data stream player, said system comprising:

a processor and memory, the memory storing instructions for execution on the processor, the instructions, which when executed by the processor, cause the processor to:

estimate a generation time for generating a media data stream;

estimate a play time at a client data stream player for a generated media data stream;

calculate a critical buffer point for a buffer of a client data stream player, the critical buffer point representing a text-to-speech generation time minus a playtime at the client data stream player;

generate the media data stream by converting text data received from a client to a media data stream consisting of audible speech;

send an alert to the client data stream player if remaining generation time for generating the media data stream is not more than the play time at the client data stream player;

maintain the rate of generation of the media data stream at an initial rate or faster after an alert has been sent; and set a priority for generating the media data stream and later raise the priority for generating the media data stream after the alert has been sent.

16. The system of claim 15, wherein remaining generation time is determined during the generation of the media data stream and wherein remaining generation time is obtained each time generation time is compared to play time by a client data stream player.

17. The system of claim 15, wherein the instructions, which when executed by the processor, further cause the processor to:

consider the size of textual data received from the client before sending the alert and consider the current workload of a data stream generation resource before sending the alert.

18. The system of claim 15, wherein the instructions, when executed by the processor, further cause the processor to:

obtain remaining generation time of an audio voice stream from a data stream generation resource in communication with the processor during the generation of the audio voice stream.

* * * * *